United States Patent
Zhu et al.

(10) Patent No.: US 9,762,727 B2
(45) Date of Patent: Sep. 12, 2017

(54) QUALITY DEGRADATION ANALYSIS METHOD, QUALITY DEGRADATION ANALYSIS DEVICE, AND NETWORK SYSTEM

(71) Applicant: HITACHI, LTD., Tokyo (JP)

(72) Inventors: Yuncheng Zhu, Tokyo (JP); Seishi Hanaoka, Tokyo (JP); Hideki Okita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 12 days.

(21) Appl. No.: 14/933,147

(22) Filed: Nov. 5, 2015

(65) Prior Publication Data

US 2016/0134747 A1    May 12, 2016

(30) Foreign Application Priority Data

Nov. 7, 2014    (JP) .................................. 2014-226584

(51) Int. Cl.
*H04M 3/22* (2006.01)
*H04W 24/00* (2009.01)

(52) U.S. Cl.
CPC ......... *H04M 3/2227* (2013.01); *H04W 24/00* (2013.01)

(58) Field of Classification Search
None
See application file for complete search history.

(56) References Cited

U.S. PATENT DOCUMENTS

| | | | |
|---|---|---|---|
| 2005/0054374 A1* | 3/2005 | Namiki ................ | H04B 17/23 455/550.1 |
| 2008/0225797 A1* | 9/2008 | Kim ................ | H04W 36/0083 370/331 |
| 2010/0172251 A1* | 7/2010 | Adam .................... | H04L 41/12 370/252 |

FOREIGN PATENT DOCUMENTS

| | | | |
|---|---|---|---|
| JP | 2009182538 A | * | 8/2009 |
| JP | 2010-109744 A | | 5/2010 |
| JP | 5239749 B2 | | 4/2013 |

OTHER PUBLICATIONS

JDS Uniphase Corporation. JDSU LTE Network End-to-End Test Solutions. N.p.: JDS Uniphase Corporation, 2012. Print.
3GPP TS 23.401, "General Packet Radio Service (GPRS) enhancements for Evolved Universal Terrestrial Radio Access Network (E-UTRAN) access", version 11.9.0 Release 11, Chapter 5. 2014.

* cited by examiner

*Primary Examiner* — Daniel Lai
(74) *Attorney, Agent, or Firm* — Volpe and Koenig, P.C.

(57) ABSTRACT

A trial number and a failure number of a procedure extending to the plurality of devices configuring the mobile core network are acquired, a process trial number and a failure number of a received message in the single device are acquired, and the possibility of quality degradation of the devices configuring the mobile core network is calculated on the basis of the trial number and the failure numbers.

17 Claims, 17 Drawing Sheets

FIG. 11

| RANKING 1101 | DEVICE ID 802 | QUALITY DEGRADATION INDEX 1102 | PROCESS FAILURE RATE 1103 |
|---|---|---|---|
| #1 | MME | .85 | 0.90% |
| #2 | S/P-GW | .64 | 1.25% |
| #3 | HSS | .13 | 0.15% |
| ... | ... | ... | ... |

FIG. 17

| IMSI | TERMINAL IP ADDRESS | C-PLANE CONNECTION TRIAL NUMBER | U-PLANE TRAFFIC AMOUNT |
|---|---|---|---|
| 44100011234567890 | 192.168.10.1 | 2390 | 23427 |
| 44100011234567891 | 192.168.10.3 | 459 | 18576 |
| 44100011234567892 | 192.168.20.1 | 1235 | 20465 |
| 44100011234567893 | 192.168.20.3 | 2342 | 12 |
| ... | | ... | ... |
| | | | |

1701 1702 1703 1704

QUALITY DEGRADATION ANALYSIS METHOD, QUALITY DEGRADATION ANALYSIS DEVICE, AND NETWORK SYSTEM

BACKGROUND OF THE INVENTION

1. Field of the Invention

The present invention relates to technology for analyzing a communication network.

2. Description of the Related Art

A mobile core network of a mobile phone service provider is configured from a plurality of network devices. In addition, a mobile phone terminal of a subscriber of a mobile phone service transmits and receives packet data with an external network such as the Internet via the plurality of devices. In addition, when service quality degradation occurs, the mobile phone service provider locates an occurrence portion of the quality degradation and engages in improvement of a sensory quality of communication of the subscriber and accident prevention.

As first technology for locating a service quality degradation, there is a method of analyzing the scale of the number of quality degraded terminals.

In Japanese Patent No. 5,239,749, a method of determining the scale of the number of quality degraded terminals as the large scale when a terminal failure rate is equal to or larger than a predetermined threshold value and estimating a failure of a network device to relay communication of mobile terminals and a communication detection device detecting the communication in a communication area or a relay line to relay the communication as a factor of the quality degradation is disclosed as the method of analyzing the scale of the number of quality degraded terminals.

In addition, as second technology for locating a service quality degradation, there is a method of visualizing a call flow mainly when the quality degradation is detected. In this method, messages of control planes transmitted and received between network devices to relay the communication are collected and a message associated with a quality degraded terminal is extracted and visualized at the time of detecting the quality degradation of a service.

In "JDSU LTE Network End-to-End Test Solutions", [online], JDSU, [Oct. 28, 2014 search], Internet (URL: http://www.jdsu.com/productliterature/lte-network-br-nsd-tm-ae.pdf), an example of a method of the detection and the visualization is described. In a system described in "JDSU LTE Network End-to-End Test Solutions", [online], JDSU, [Oct. 28, 2014 search], Internet (URL: http://www.jdsu.com/productliterature/lte-network-br-nsd-tm-ae.pdf), for example, a service provider defines a combination of a plurality of Key Performance indexes (KPI) as a quality degradation index in advance and visualizes a communication failed call flow.

SUMMARY OF THE INVENTION

In the first technology, only the failure of the network device is estimated and a quality degradation occurrence device is not located. In the second technology, it is necessary to observe a finally visualized call flow and determine an occurrence place of the quality degradation by human strength. For this reason, automatic estimation of the quality degradation occurrence device in the mobile core network is difficult and estimation precision depends on an experience of an operator.

A representative example of the invention disclosed in the present application is as follows.

A quality degradation analysis method in a network system including a plurality of device configuring a mobile core network, wherein a trial number and a failure number of a procedure extending to the plurality of devices configuring the mobile core network are acquired, a process trial number and a failure number of a received message included in the procedure in the single device are acquired, and the possibility of quality degradation of the device is calculated on the basis of the trial number and the failure number of the procedure and the process trial number and the failure number of the received message.

Further, a quality degradation analysis device for analyzing quality degradation of a plurality of devices configuring a mobile core network, wherein a trial number and a failure number of a procedure extending to the plurality of devices configuring the mobile core network are acquired, a process trial number and a failure number of a received message included in the procedure in the single device are acquired, and the possibility of quality degradation of the device is calculated on the basis of the trial number and the failure number of the procedure and the process trial number and the failure number of the received message.

Further, a network system, including: a plurality of devices which configure a mobile core network; a collection device which collects a trial number and a failure number of a procedure extending to the plurality of devices and a process trial number and a failure number of a received message included in the procedure in the single device; and a quality degradation analysis device which analyzes quality degradation of the plurality of devices, wherein the quality degradation analysis device calculates the possibility of quality degradation of the device, on the basis of the trial number and the failure number of the procedure and the process trial number and the failure number of the received message.

According to the invention, automatic estimation of a quality degradation occurrence device in a mobile core network is enabled without depending on an experience of an operator.

Other objects, configurations, and effects will become apparent from the following description of embodiments.

BRIEF DESCRIPTION OF THE DRAWINGS

FIG. 11 illustrates an example of an output screen of the quality degradation locating device in the first embodiment.

FIG. 17 illustrates an example of a quality degradation determination index table in the third embodiment.

DESCRIPTION OF THE PREFERRED EMBODIMENTS

Embodiments of the invention will be described hereinafter using the drawings.

In the following embodiments, the invention will be described in a plurality of sections or embodiments when required as a matter of convenience. However, these sections or embodiments are not irrelevant to each other unless otherwise stated and one relates to the entire or part of the other as a modification, details, or a supplementary explanation thereof.

In addition, in the following embodiments, when referring to the number of elements (including the number of pieces, values, amounts, ranges, and the like), the number of the elements is not limited to a specific number unless otherwise stated or except for the case in which the number is apparently limited to a specific number in principle and the number larger or smaller than the specified number is also applicable.

In addition, in the following embodiments, it goes without saying that components (including element steps) are not always indispensable unless otherwise stated or except for the case in which the components are apparently indispensable in principle.

In addition, in the embodiments described below, each embodiment may be applied independently and a combination of a plurality of embodiments or all embodiments may be applied.

First Embodiment

In this embodiment, a control plane message transferred on a link of a mobile core network is analyzed, so that a trial number and a failure number of the entire of a series of call flows extending to a plurality of devices and a process trial number and a failure number of a received message in a single device are acquired. A process failure rate of the device is estimated on the basis of the acquired trial number and failure number. The device calculates a statistical distribution of the process failure rate in a normal mode and locates a quality degradation location, on the basis of the probability equal to or lower than the process failure rate of a service quality degradation occurrence period of time in the statistical distribution.

Figure 1:
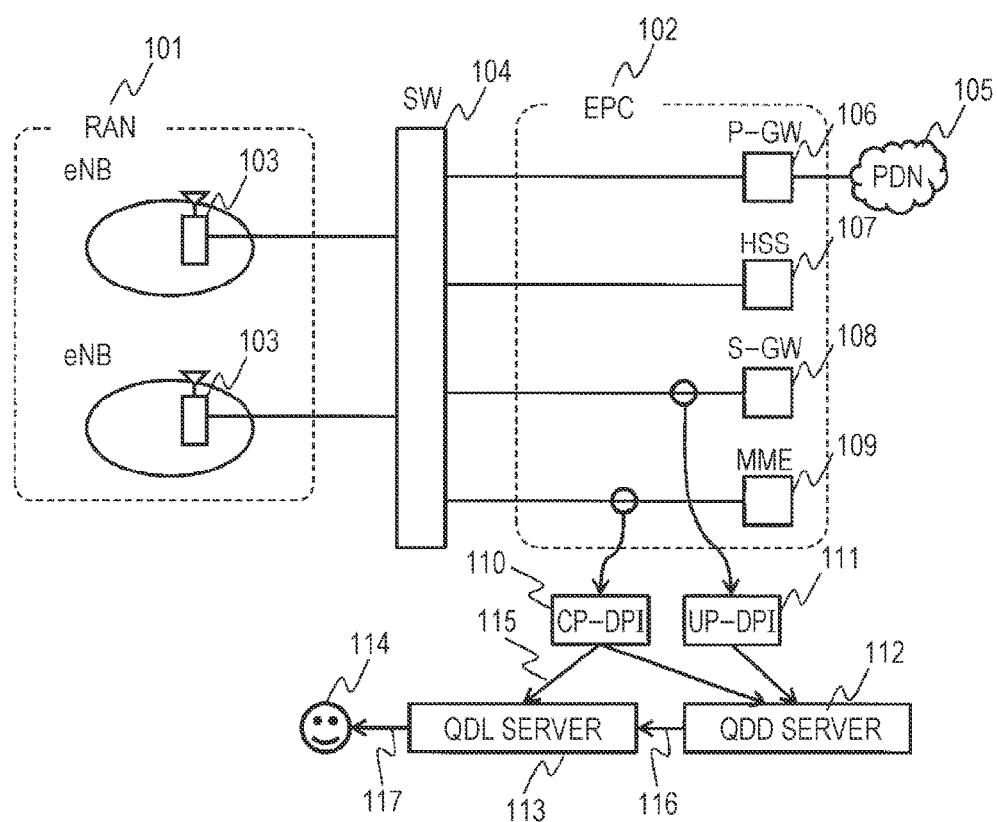
FIG. 1 illustrates an example of a system configuration according to a first embodiment.

A system configuration according to this embodiment includes a radio access network 101 (hereinafter, referred to as the RAN) to accommodate subscriber terminals, a mobile core network 102 (hereinafter, referred to as the EPC), a packet data network 105 (hereinafter, referred to as the PDN), deep packet inspection devices 110 and 111 (hereinafter, referred to as the DPIs), a quality degradation occurrence detection device 112 (hereinafter, referred to as the QDD server), and a quality degradation locating device 113 (hereinafter, referred to as the QDL server), as illustrated in FIG. 1. In addition, the EPC 102 is connected to a plurality of base stations 103 via a device such as a switch 104 to relay data and includes a Mobility Management Entity 109 (hereinafter, referred to as the MME), a home subscriber server 107 (hereinafter, referred to as the HSS), a serving-gateway device 108 (hereinafter, referred to as the S-GW), and a PDN gateway device 106 (hereinafter, referred to as the P-GW). The MME 109 manages a bearer between the subscriber terminal and the P-GW 106. The MME 109 is a communication device that accommodates one or more base stations 103 and provides mobility control. The HSS 107 is a database device to hold subscriber information and provides the subscriber information to the MME 109 according to a demand for service control. The MME 109 selects the S-GW 108 for the subscriber terminal in attachment and handover of the subscriber terminal. The S-GW 108 is a gateway that accommodates one or more base stations 103 and transmits user data between the P-GW 106 and the base station 103. The P-GW 106 is a gateway that has an interface with the PDN 105. The P-GW 106 provides an IP address to the subscriber terminal.

The DPI is an analysis device that analyzes a packet on the network. The DPI 110 (hereinafter, referred to as the CP-DPI) to analyze a control plane packet monitors each interface which the MME 109 is connected to the base station 103 and other device of the EPC 102. Each interface is described in a section 5.1.1 of 3GPP TS 23.401, "General Packet Radio Service (GPRS) enhancements for Evolved Universal Terrestrial Radio Access Network (E-UTRAN) access", version 11.9.0 Release 11, Chapter 5. The DPI 111 (hereinafter, referred to as the UP-DPI) to analyze a user traffic packet monitors an S1 interface (S1-U) to connect the base station 103 and the S-GW 108. In addition, the CP-DPI 110 and the UP-DPI 111 transfer various messages or statistical information acquired to the QDD server 112 and the QDL server 113.

The QDD server 112 uses a specific method, such as described in "JDSU LTE Network End-to-End Test Solutions", [online], JDSU, [Oct. 28, 2014 search], Internet (URL: http://www.jdsu.com/productliterature/lte-network-br-nsd-tm-ae.pdf), detects an occurrence situation of service quality degradation of the system according to this embodiment in a specific period of time, on the basis of the various messages or the statistical information received from the CP-DPI 110 and the UP-DPI 111, and transfers the occurrence situation to the QDL server 113.

In addition, the QDL server 113 calculates the probability of quality degradation of each device in the EPC 102, on the basis of procedure statistical information and message statistical information 115 received from the CP-DPI 110 and quality degradation detection information 116 received from the QDD server 112, and locates a quality degradation location. The QDL server 113 provides the located quality degradation location as quality degradation locating information 117 to an operator 114.

Figure 2:
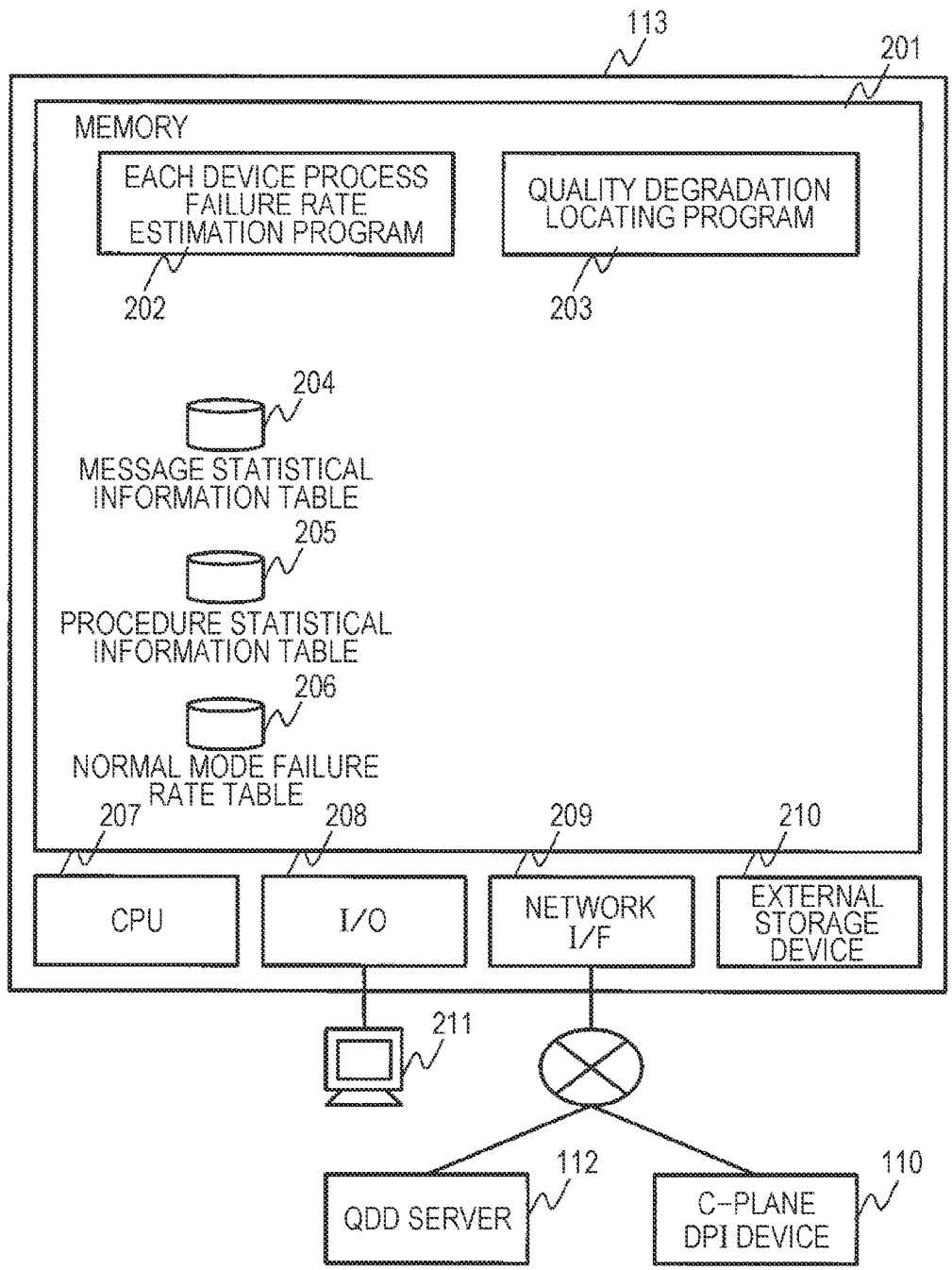
FIG. 2 illustrates a configuration example of a quality degradation locating device in the first embodiment.

FIG. 2 illustrates a configuration example of the QDL server 113 according to this embodiment. A function of the QDL server 113 in this embodiment is stored in a form of program software in an external storage device 210 of a general computer, is developed on a memory 201, and is executed by a CPU 207. In addition, the QDL server 113 performs communication with the CP-DPI 110 and the QDD server 112 via a network interface 209. The memory 201 of the QDL server 113 stores each device process failure rate estimation program 202 and a quality degradation locating program 203. In addition, the memory 201 of the QDL server 113 stores a message statistical information table 204 to store a process trial number, a success number, and a failure number of a received message in the single device of the EPC 102, a procedure statistical information table 205 to store a trial number, a success number, and a failure number of the entire of a series of call flows extending to the plurality of devices of the EPC 102 described in a chapter 5 of 3GPP TS 23.401, "General Packet Radio Service (GPRS) enhancements for Evolved Universal Terrestrial Radio Access Network (E-UTRAN) access", version 11.9.0 Release 11, and a normal mode failure rate table 206 to store a process failure rate calculation result of each device of the EPC 102 in a normal mode. The procedure is synonymous with the entire of a series of call flows extending to the plurality of devices of the EPC 102 described in the chapter 5 of 3GPP TS 23.401, "General Packet Radio Service (GPRS) enhancements for Evolved Universal Terrestrial Radio Access Network (E-UTRAN) access", version 11.9.0 Release 11. In addition, the QDL server 113 is connected to a screen output device 211 via an input/output interface 208 and outputs a quality degradation locating result.

In this embodiment, the configuration in which the program and the information are stored in the memory of the single computer has been described. However, a configuration in which the information is stored in the external storage device, the information is read from the external storage device, whenever the program is processed, and the information is stored in the external storage device, whenever each process is completed, can be taken.

In addition, the program and the information can be distributed to a plurality of computers and can be stored in the plurality of computers. For example, the information can be mounted as a table of a relational database and can be stored in a database server different from the QDL server 113 and the program executed on the QDL server 113 can refer to and update the information on the database server.

The difference of the method of storing the information described above does not affect the essence of the present invention.

Figure 3:
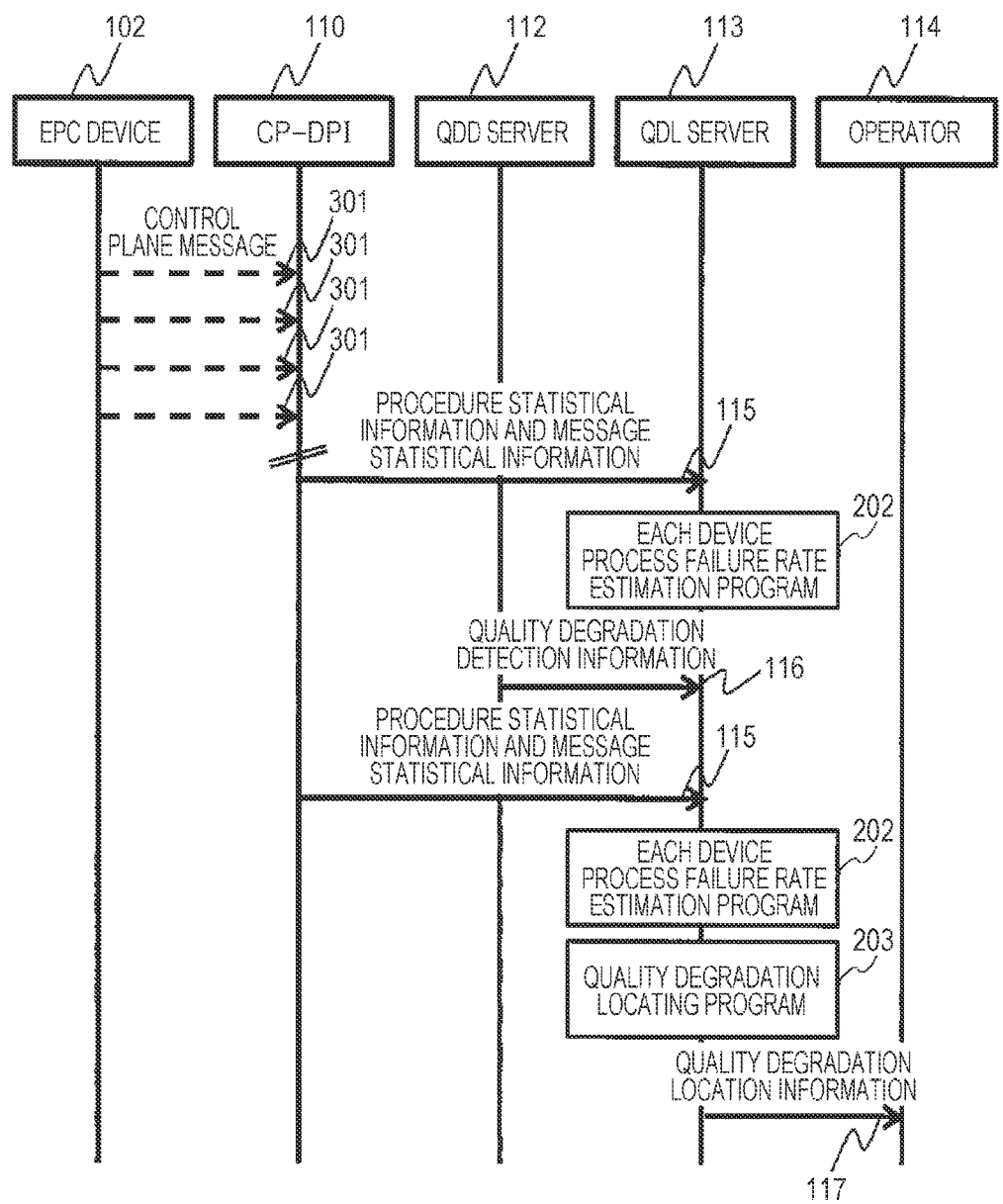
FIG. 3 illustrates an example of a process sequence in the first embodiment.

Here, a flow of a quality degradation locating method will be described using FIG. 3. The CP-DPI 110 collects a control plane message 301 between the devices included in the EPC 102. In this embodiment, data of an S1-MME interface between the MME 109 and the eNB 103, an S11 interface between the MME 109 and the S-GW 108, and an S6a interface between the MME 109 and the HSS 107 is collected. The CP-DPI 110 processes information collected at a constant time interval and transmits the information as the procedure statistical information and message statistical information 115 to the QDL server 113. The QDL server 113 calculates a process failure rate of each device included in the EPC 102, using each device process failure rate estimation program 202, whenever the QDL server 113 receives the procedure statistical information and message statistical information 115.

Meanwhile, the QDD server 112 detects an occurrence situation of the quality degradation, on the basis of the information acquired from the CP-DPI 110 and the UP-DPI 111. The QDD server 112 transmits a detection result as the quality degradation detection information 116 to the QDL server 113. When the QDL server 113 receives next procedure statistical information and message statistical information 115 after receiving the quality degradation detection information 116, the QDL server 113 calculates a process failure rate of each device included in the EPC 102 using each device process failure rate estimation program 202 and locates a quality degradation location using the quality degradation locating program 203. The QDL server 113 provides the located quality degradation location as the quality degradation locating information 117 as an operator 114.

Figure 4:
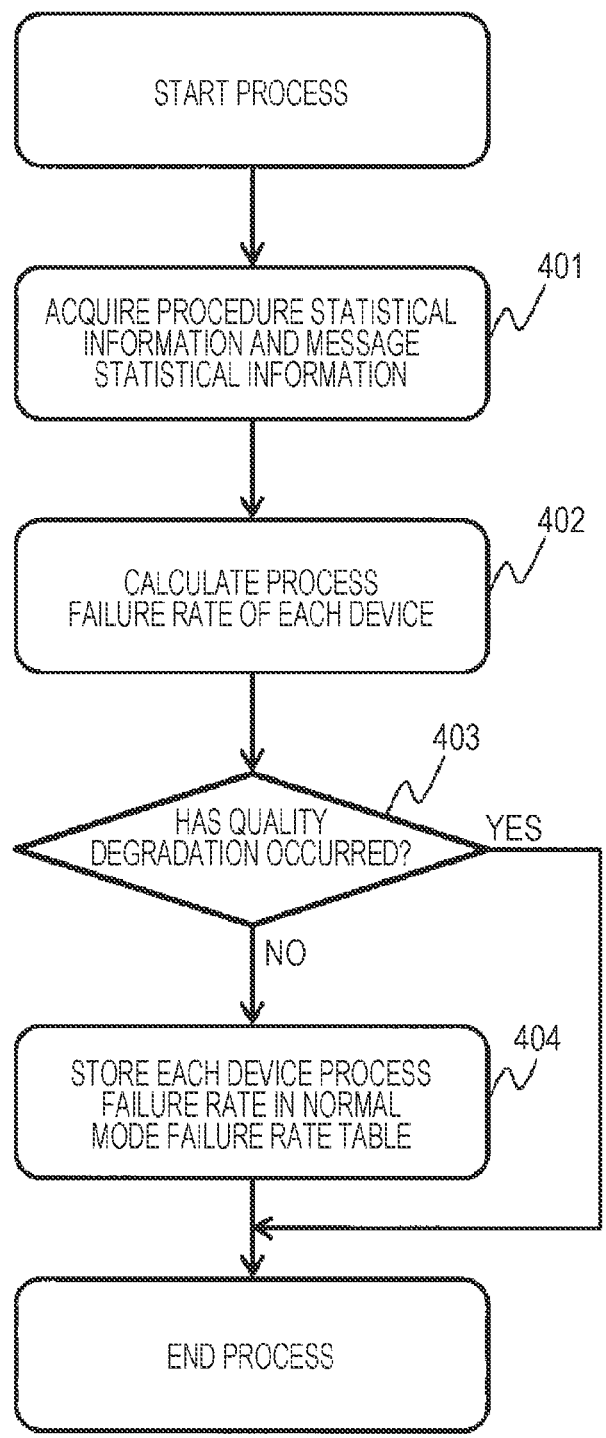
FIG. 4 illustrates an example of a process flow of each device process failure rate estimation program in the first embodiment.

FIG. 4 illustrates an example of a specific process flow of each device process failure rate estimation program 202 executed by the QDL server 113. In step 401, the QDL server 113 stores the received procedure statistical information and message statistical information 115 in the message statistical information table 204 and the procedure statistical information table 205. Next, in step 402, the QDL server 113 calculates a process failure rate of each device in the EPC 102, on the basis of the stored procedure statistical information and message statistical information. As an example of a calculation method, first, for a procedure existing in the procedure statistical information, a process failure rate of each device of the EPC 102 relating to the procedure is calculated on the basis of the message statistical information included in each procedure. In addition, the process failure rate in each procedure calculated for each device of the EPC 102 is weighted by a trial number of each procedure and a final process failure rate is calculated. As a result, a process failure rate of 1 is calculated for each device of the EPC 102. The QDL server 113 grasps which message is included in each procedure in advance, according to a definition of the procedure of 3GPP TS 23.401, "General Packet Radio Service (GPRS) enhancements for Evolved Universal Terrestrial Radio Access Network (E-UTRAN) access", version 11.9.0 Release 11, Chapter 5. In step 403, the QDL server 113 branches the process flow, on the basis of a reception situation of the quality degradation detection information 116 from an end of the previous program process. When the quality degradation detection information 116 is not received, in step 404, the QDL server 113 stores the calculated process failure rate of each device in the normal mode failure rate table 206 and ends each device process failure rate estimation program 202. Meanwhile, when the quality degradation detection information 116 is received, the QDL server 113 ends each device process failure rate estimation program 202 and starts the quality degradation locating program 203.

Figure 6:
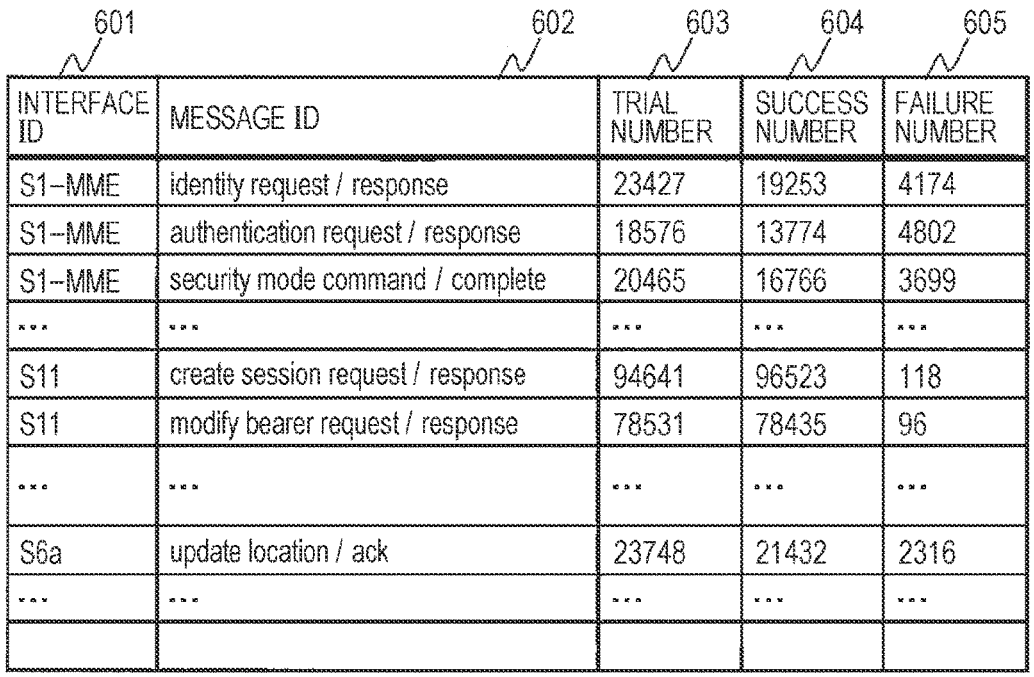
FIG. 6 illustrates an example of a message statistical information table in the first embodiment.

FIG. 6 illustrates an example of the message statistical information table 204 held by the QDL server 113. The QDL server 113 stores the procedure statistical information and message statistical information 115 acquired from the CP-DPI 110 in the message statistical information table 204 and the procedure statistical information table 205, respectively. The message statistical information includes an interface ID 601 becoming an interface identifier, a message ID 602 becoming a message identifier, and a trial number 603, a success number 604, and a failure number 605 of a message on an interface. The CP-DPI 110 can acquire the trial number 603 of the message from a count of a message showing a request. In addition, the CP-DPI 110 can acquire the success number 604 from a count of a message showing a success response. The failure number 605 of the message is a difference of the trial number 603 and the success number 604.

Figure 7:
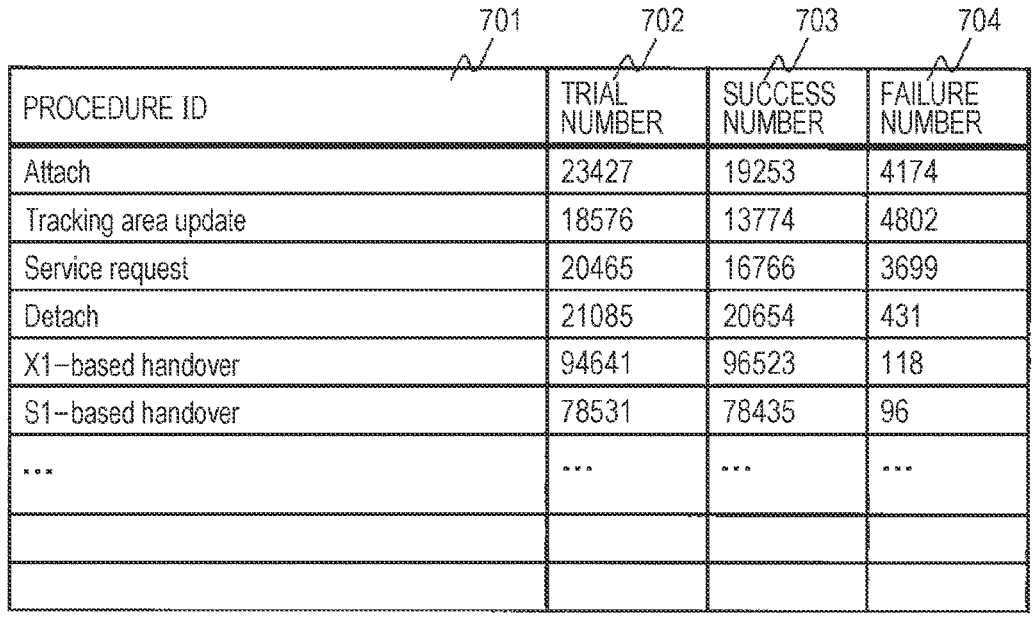
FIG. 7 illustrates an example of a procedure statistical information table in the first embodiment.

FIG. 7 illustrates an example of the procedure statistical information table 205 held by the QDL server 113. The procedure statistical information includes a procedure ID 701 becoming a procedure identifier and a trial number 702, a success number 703, and a failure number 704 of a procedure. The CP-DPI 110 can acquire the trial number 702 of the procedure from a count of a first message of the procedure defined in a call flow. In addition, the CP-DPI 110 can acquire the success number 703 from a count of a final success message of the procedure. The failure number 704 of the procedure is a difference of the trial number 702 and the success number 703.

Figure 8:
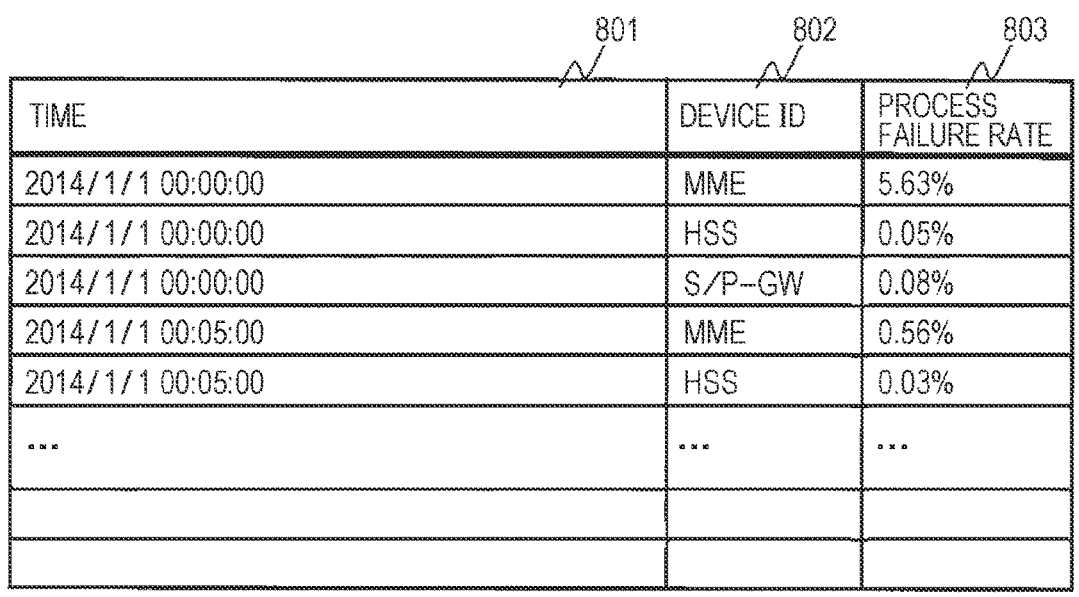
FIG. 8 illustrates an example of a normal mode failure rate table in the first embodiment.

FIG. 8 illustrates an example of the normal mode failure rate table 206 held by the QDL server 113. The normal mode failure rate includes a time 801, a device ID 802 showing an identifier of a device, and a process failure rate 803 of the device at the time. In the example of FIG. 8, a name of the device is adopted as the device ID. In addition, an identifier such as an address of the device that can specify the device can be used. As described above, the process failure rate of each device is calculated whenever the procedure statistical information and the message statistical information are acquired. For this reason, the process failure rate of each device at a constant time interval is stored in the normal mode failure rate table 206.

Figure 5:
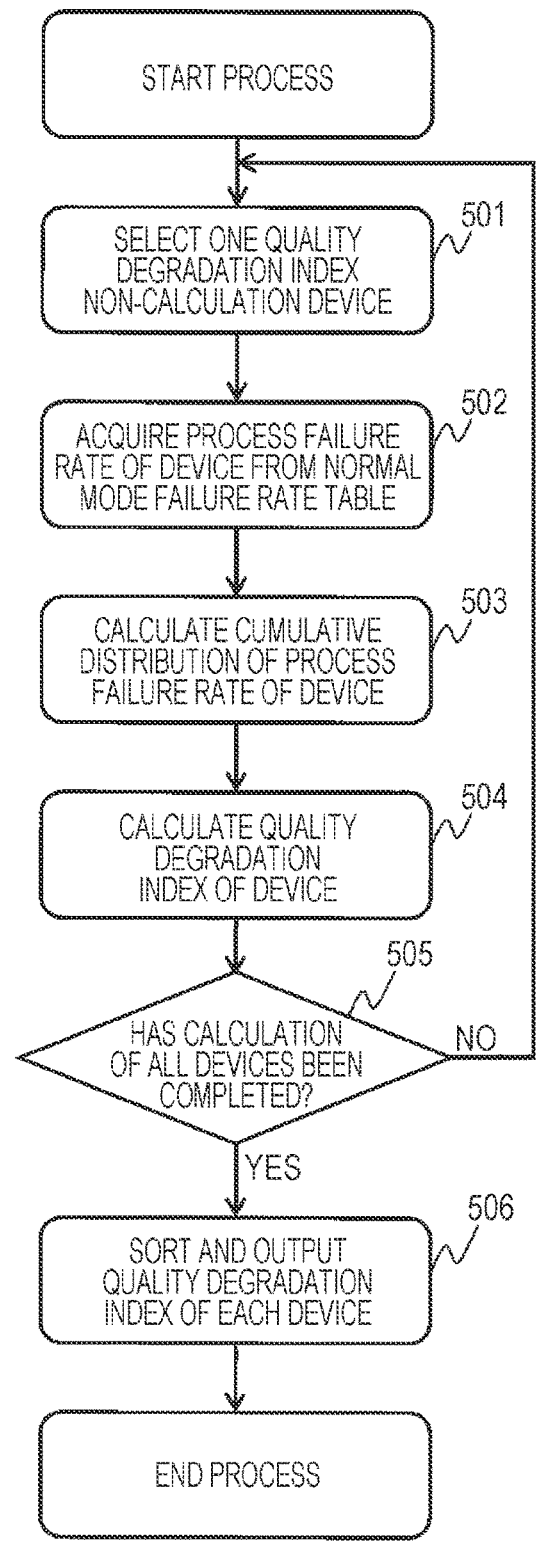
FIG. 5 illustrates an example of a process flow of a quality degradation locating program in the first embodiment.
Figure 9:
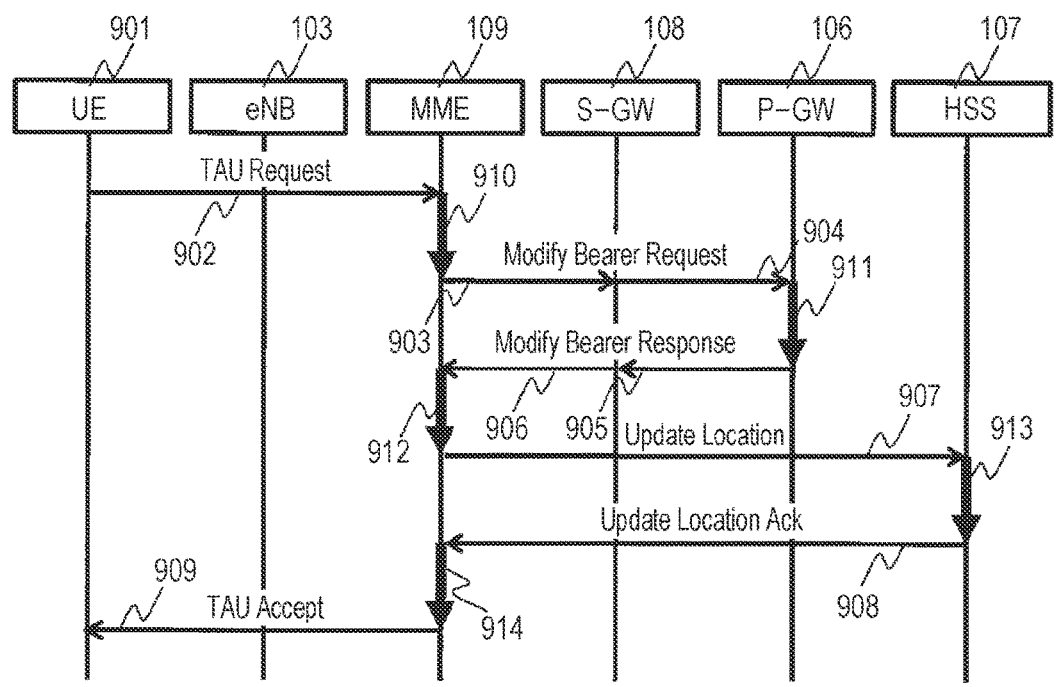
FIG. 9 illustrates an example of a call flow used for a process of each device process failure rate estimation program in the first embodiment.

In FIG. 9, a specific example of calculation of a process failure rate of the device of the EPC 102 relating to the single procedure of step 402 is described as an example of the case in which a part of FIG. 5.3.3.2-1 of 3GPP TS 23.401, "General Packet Radio Service (GPRS) enhancements for Evolved Universal Terrestrial Radio Access Network (E-UTRAN) access", version 11.9.0 Release 11, Chapter 5 is omitted. In arrows 902 to 909, main messages included in a procedure of "Tracking Area Update without S-GW change" described in 3GPP TS 23.401, "General Packet Radio Service (GPRS) enhancements for Evolved Universal Terrestrial Radio Access Network (E-UTRAN) access", version 11.9.0 Release 11, Chapter 5 are shown. In arrows 910 to 914, a series of process steps generated when the first message 902 of the procedure is received are shown.

If a call flow of FIG. 9 is collated with the message statistical information table of FIG. 6, a process failure rate P(S/P-GW) of step 911 in the S/P-GW can be calculated by a trial number and a failure number of "modify bearer request/response" of the message statistical information. In addition, a process failure rate P(HSS) of step 913 in the HSS can be calculated by a trial number and a failure number of "update location/ack" of the message statistical information. In addition, if the call flow is collated with the procedure statistical information table of FIG. 7, a failure rate P(Procedure) of the entire procedures can be calculated by a trial number and a failure number of "Tracking area update" of the procedure statistical information. In this example, the S-GW and the P-GW are regarded as one device and the process failure rate is calculated.

In addition, if a process failure rate of i-th process step is set as $p_i$, in failure rates of the entire procedure including n process steps and individual process steps, there is a mathematical relation represented by the following expression 1.

$$P(\text{Procedure}) = p_1 + p_2(1-p_1) + \ldots + p_n \Pi_{i=1}^{n-1}(1-p_i)$$ [Mathematical Formula 1]

According to the above expression, if process failure rates of process steps 910, 912, and 914 are set as P(MME), a relation of P(Procedure)=P(MME)+(1−P(MME))*P(S/P-GW)+(1−P(MME))*(1−P(S/P-GW))*P(MME)+(1−P(MME))^2*(1−P(S/P-GW))*P(HSS)+(1−P(MME))^2*(1−P(S/P-GW))*(1−P(HSS))*P(MME) is realized. As described above, because P(Procedure), P(S/P-GW), and P(HSS) are values calculated from the procedure statistical information and the message statistical information, a numerical expression in which there is only a unknown variable P(MME) is obtained. That is, the process failure rate of each device relating to the procedure can be calculated.

In addition, if the number of types of procedures included in the procedure statistical information table is set as m and a trial number of the i-th procedure is set as $n_i$, the process failure rate of each device is calculated for every procedure and is weighted by the trial number of each procedure using a method represented by the following expression 2, so that the process failure rate of each device in the entire procedures can be calculated.

$$\begin{cases} p(MME) = \dfrac{\sum_{i=1}^{m}(n_i p_i(MME))}{\sum_{i=1}^{m} n_i} \\ p(S/P-GW) = \dfrac{\sum_{i=1}^{m}(n_i p_i(S/P-GW))}{\sum_{i=1}^{m} n_i} \\ p(HSS) = \dfrac{\sum_{i=1}^{m}(n_i p_i(HSS))}{\sum_{i=1}^{m} n_i} \end{cases}$$ [Mathematical Formula 2]

By the configuration of the device, there is a variation in the call flow. For example, when a plurality of S-GWs exist, a variation of "Tracking Area Update with S-GW change" described in 3GPP TS 23.401, "General Packet Radio Service (GPRS) enhancements for Evolved Universal Terrestrial Radio Access Network (E-UTRAN) access", version 11.9.0 Release 11, Chapter 5 is included in the procedure of "Tracking Area Update". In addition, when a plurality of MMEs exist, a message associated with an MME relocation is included in the procedure. In this case, a ratio of each variation is calculated using the procedure statistical information and the message statistical information and a trial number of a message becoming a characteristic of the variation, a process failure rate is calculated by a numerical expression relation corresponding to each ratio, and estimation precision is improved.

FIG. 5 illustrates an example of a specific process flow of the quality degradation locating program 203 executed by the QDL server 113. In step 501, the QDL server 113 selects one of devices in which a quality degradation index is not yet calculated, as a calculation target. Next, in step 502, the QDL server 113 extracts a process failure rate record of which an identifier is matched with an identifier of the selected device, from the normal mode failure rate table 206. An extraction range is all data of the normal mode failure rate table 206. In step 503, the QDL server 113 calculates a cumulative distribution of a process failure rate of the device in a normal mode, from the extracted process failure rate record. In step 504, the QDL server 113 calculates a value of the cumulative probability (lower probability) corresponding to the value of the process failure rate of the device calculated after occurrence of the quality degradation as a quality degradation index of the device. The quality degradation index shows the probability of the quality degradation of the device. In step 505, the QDL server 113 determines whether calculation of the quality degradation index has been completed for all of the devices in the EPC 102. When a non-calculation device exists, the QDL server 113 returns to step 501 and calculates the next device and executes calculation. When the calculation is completed for all of the devices, the QDL server 113 proceeds to step 506 and rearranges the quality degradation index of each device in descending order and outputs a result thereto to a screen of the screen output device 211.

Figure 10A:
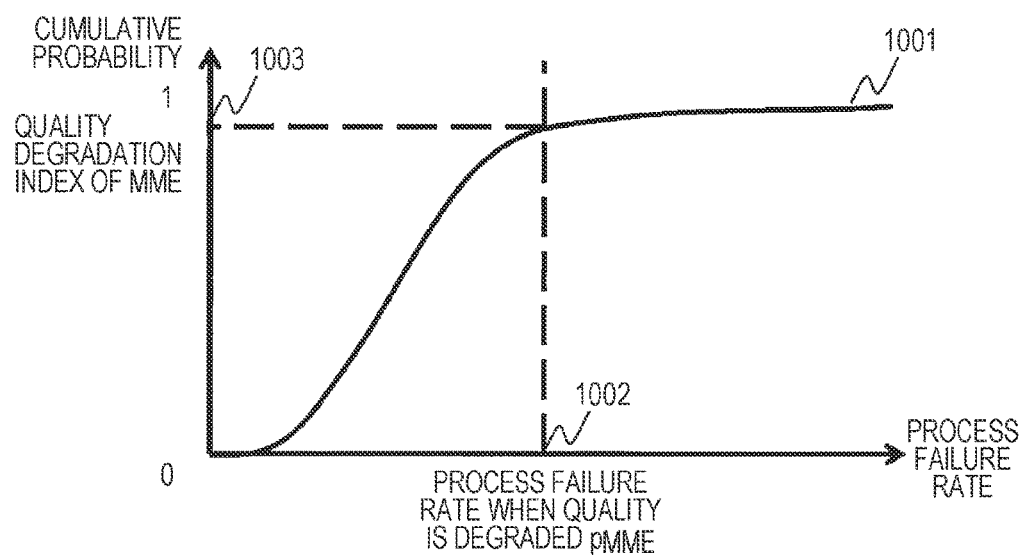
FIG. 10A illustrates an example of a quality degradation index calculation method in the first embodiment.
Figure 10B:
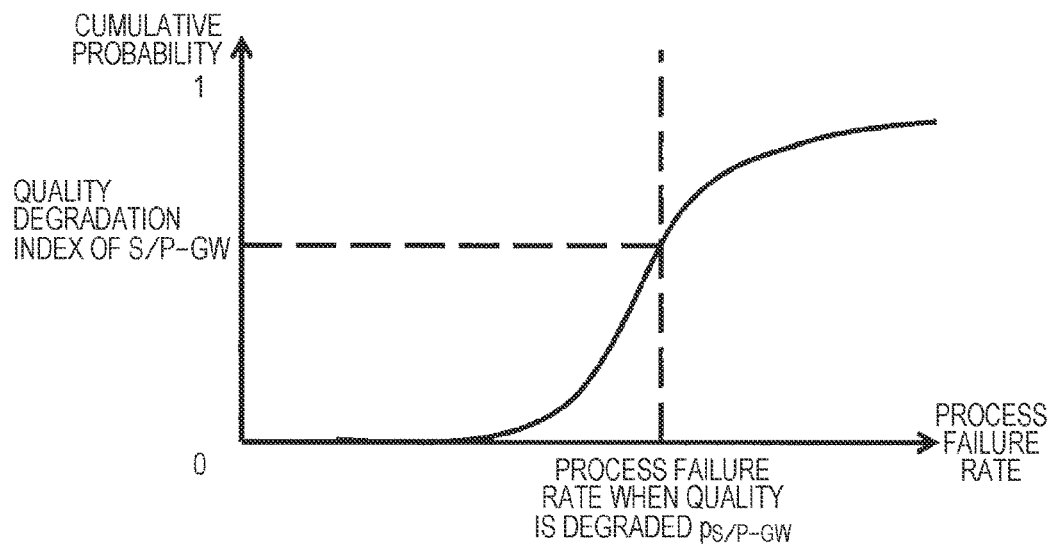
FIG. 10B illustrates an example of a quality degradation index calculation method in the first embodiment.
Figure 10C:
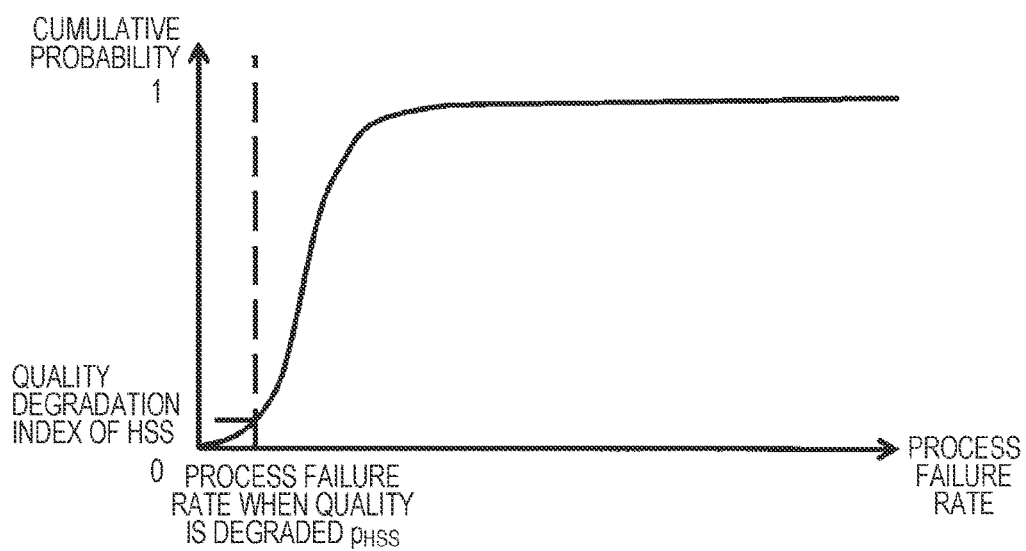
FIG. 10C illustrates an example of a quality degradation index calculation method in the first embodiment.

FIGS. 10A to 10C illustrate an example of a quality degradation index calculation method of each device. FIG. 10A illustrates an example of the MME, FIG. 10B illustrates an example of the S/P-GW, and FIG. 10C illustrates an example of the HSS. The quality degradation locating program 203 is executed, a cumulative distribution of a process failure rate in a normal mode is calculated for the MME 109, and the cumulative probability (lower probability) 1001 thereof is calculated. In addition, a process failure rate calculated by calculation of each device process failure rate estimation program 202 executed in a constant period after occurrence of the quality degradation is shown as a process failure rate P (MME) 1002 when a quality is degraded. The quality degradation index of the MME 109 is calculated as a value 1003 of the cumulative probability (lower probability) corresponding to a value of the process failure rate 1002. Likewise, for each of the S/P-GW and the HSS, a quality degradation index is calculated using the same method.

FIG. 11 illustrates an example of a screen showing a result output from the QDL server 113. A result output screen includes a ranking 1101 of a quality degradation index, a device ID 802 corresponding to the ranking, a calculated quality degradation index 1102, and a calculated process failure rate 1103. Because the ranking 1101 of the quality degradation index shows a ranking where the possibility of quality degradation is high, the operator can easily grasp a device in which the quality degradation has occurred.

In this embodiment, the screen to output the calculation result in the form of the table is shown to display the locating result of the quality degradation. However, the locating result of the quality degradation can be displayed on network topology. In addition, a device in which a quality degradation index is more than a predetermined threshold value can be regarded as the quality degradation and only a part of a calculation result can be displayed. In addition to the calculation result, other associated information can be displayed.

As such, in this embodiment, the control plane message transferred on the link of the mobile core network is analyzed, so that the trial number and the failure number of the procedure and the process trial number and the failure number of the received message in the single device are acquired. The probability of the quality degradation of the device in the mobile core network is calculated on the basis of the trial number and the failure number. As a result, automatic estimation of the quality degradation occurrence device is enabled without depending on an experience of the operator.

In addition, the QDL server 113 calculates the probability of the quality degradation of the device in the mobile core network, on the basis of the statistical information of the procedure and the statistical information of the message included in the procedure. That is, because the QDL server 113 uses only the statistical information, the procedure and the message thereof do not need to be associated with each other for each trial of the procedure, as in "JDSU LTE Network End-to-End Test Solutions", [online], JDSU, [Oct. 28, 2014 search], Internet (URL: http://www.jdsu.com/productliterature/lte-network-br-nsd-tm-ae.pdf). For this reason, a requirement for the analysis device can be greatly reduced and reduction of a calculation cost and improvement of calculation efficiency can be realized.

In addition, the cumulative distribution of the process failure rate of the device in the normal mode is calculated and the value of the cumulative probability (lower probability) corresponding to the process failure rate after occurrence of the quality degradation is used as the quality degradation index showing the possibility of the quality degradation. As a result, the quality degradation index reflects the possibility of the quality degradation of the device more surely by removing an influence on the process failure rate by the process failure that may occur even in the normal mode in which the quality degradation does not occur, from calculation of the quality degradation index.

In addition, the identifier and the quality degradation index of the device are associated with each other and are displayed, so that the operator can easily grasp which device has a factor of the quality degradation.

In addition, in this embodiment, the process failure rate of each device in the EPC 102 calculated by each device process failure rate estimation program 202 is used for calculation of the quality degradation index at the time of occurrence of the quality degradation. However, the calculation result of the process failure rate of each device in the EPC 102 can be used as predictive detection by analysis of patterns of a transition and a movement in a period of time.

In addition, in this embodiment, the example of the case in which the quality degradation detection information is received from the QDD server and the QDL server executes the quality degradation locating program has been described. However, the QDL server can execute the quality degradation locating program regularly and calculate the quality degradation index.

Second Embodiment

In this embodiment, a device management system to control devices in an EPC 102 analyzes an internal log of each device to acquire a process trial number and a failure number of procedure statistical information and message statistical information. A process failure rate of the device is estimated on the basis of the acquired trial number and failure number. The device calculates a statistical distribution of a process failure rate in a normal mode and locates a quality degradation location, on the basis of the probability equal to or lower than a process failure rate of a service quality degradation occurrence period of time in the statistical distribution. For this reason, in this embodiment, even when there is no CP-DPI to analyze a control plane message, the quality degradation location can be located.

Figure 12:
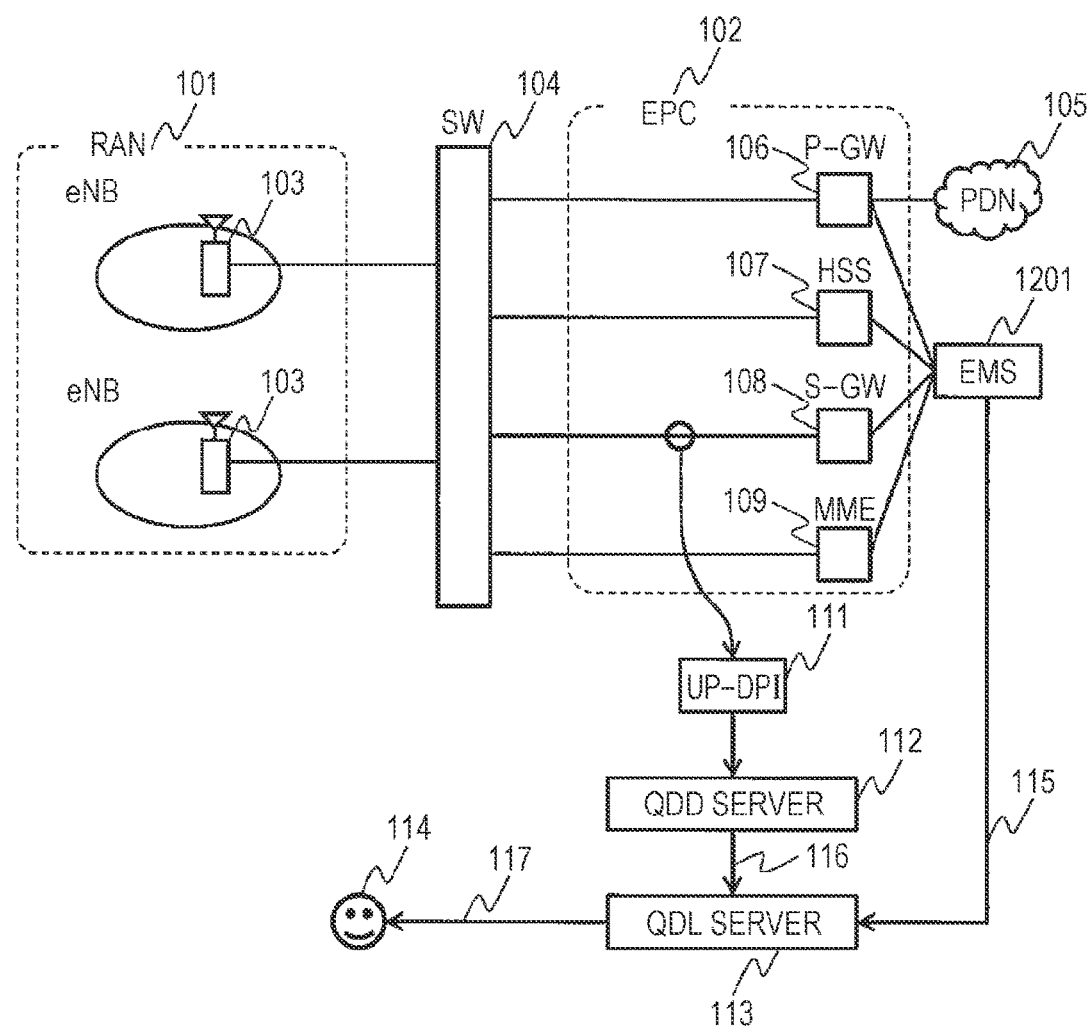
FIG. 12 illustrates an example of a system configuration according to a second embodiment.

A system configuration according to this embodiment will be described using FIG. 12. Explanation of content overlapped to the content of the first embodiment is omitted. In the system configuration according to this embodiment, there is a device management system 1201 (hereinafter, referred to as the EMS) that is connected to each device in the EPC 102 and controls the device. The EMS 1201 collects a log of the device and transfers procedure statistical information and message statistical information 115 to a QDL server 113 regularly. In the log of the device, a process trial number and a success response number of a received message in the device for each procedure are included. For this reason, the EMS 1201 can acquire the procedure statistical information and the message statistical information described in the first embodiment by analyzing the log of the device. The QDL server 113 calculates the probability of the quality degradation of each device in the EPC 102, on the basis of the procedure statistical information and message statistical information 115 received from the EMS 1201 and quality degradation detection information 116 received from the QDD server 112, and locates a quality degradation location. In addition, quality degradation locating information 117 thereof is provided to an operator 114.

Figure 13:
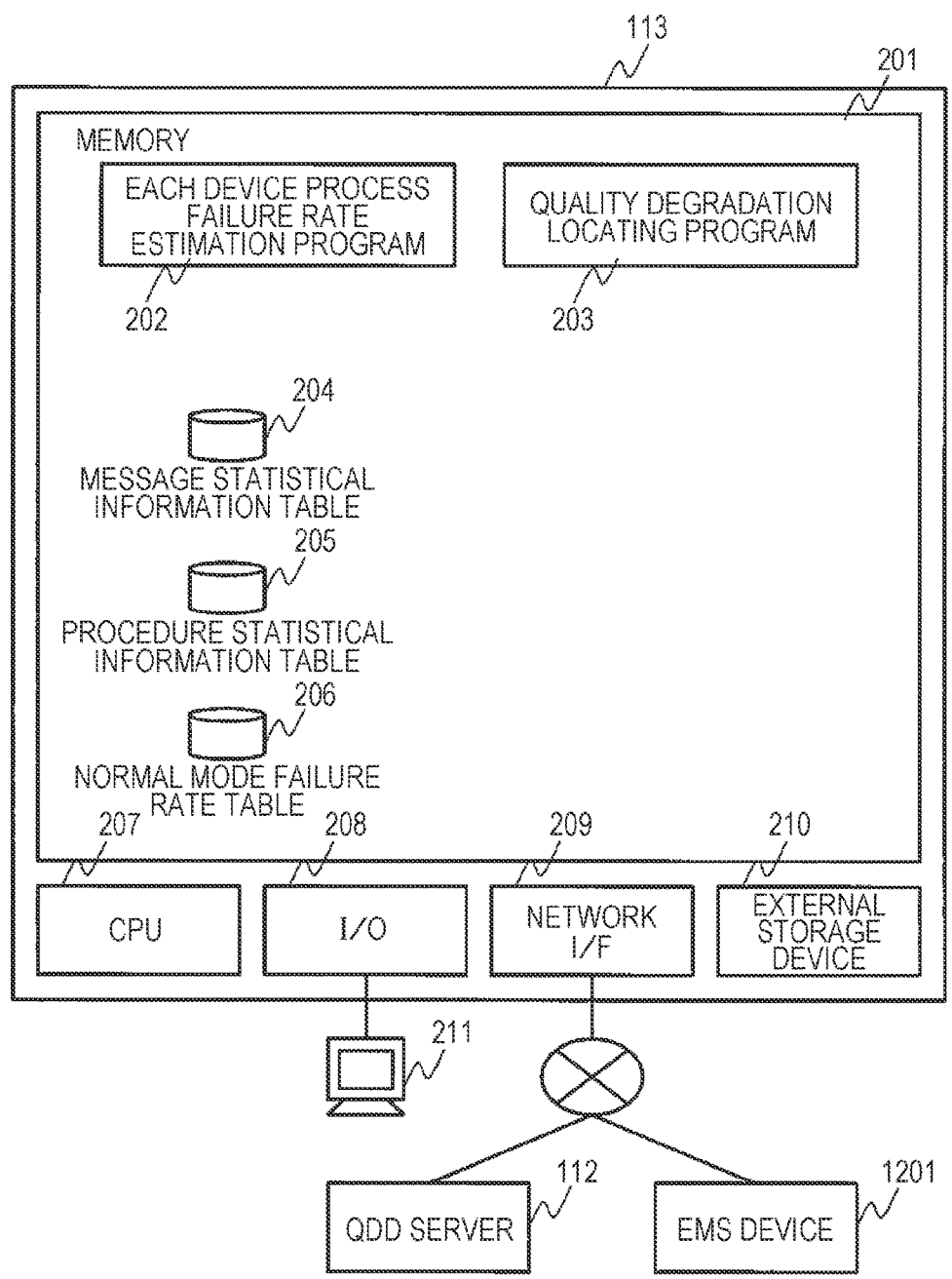
FIG. 13 illustrates a configuration example of a quality degradation locating device in the second embodiment.

FIG. 13 illustrates a configuration example of the QDL server 113 according to this embodiment. The QDL server 113 in this embodiment performs communication with the EMS 1201 and the QDD server 112 via a network interface 209.

Third Embodiment

In this embodiment, a control plane message transferred on a link of a mobile core network and user traffic are analyzed to execute detection of service quality degradation occurrence and locating of a quality degradation location. When the service quality degradation occurrence is detected, it is requested for an operation support system to control a device becoming a quality degradation factor. For this reason, in this embodiment, all of the detection of the quality degradation occurrence, the specification of the factor, and the control request can be automatically executed and automation and speeding up of quality degradation elimination can be realized without depending on an interference by human strength of an operator and the like. In addition, a function of detecting the service quality degradation occurrence and a function of locating a quality degradation location can be realized by one analysis device.

Figure 14:
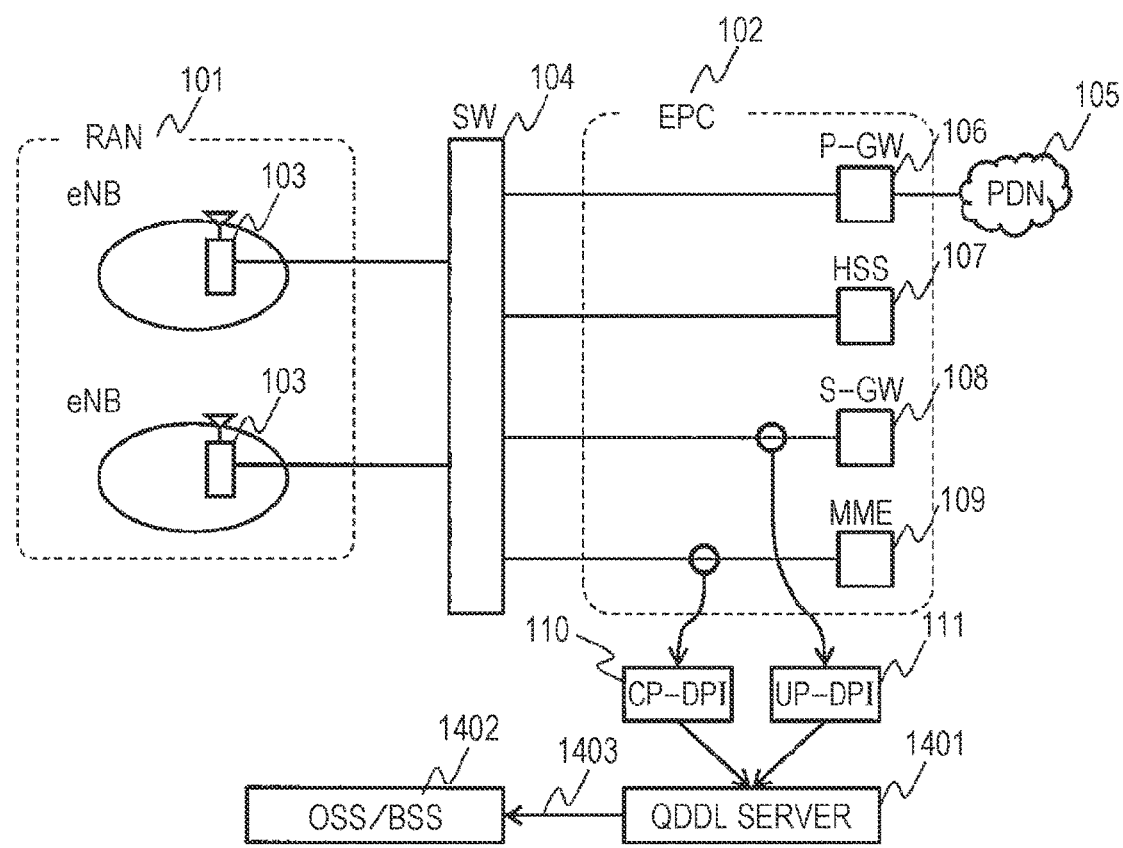
FIG. 14 illustrates an example of a system configuration according to a third embodiment.

A system configuration according to this embodiment will be described using FIG. 14. Explanation of content overlapped to the content of the first embodiment is omitted. In the system configuration according to this embodiment, a CP-DPI 110 to analyze the control plane message and a UP-DPI 111 to analyze the user traffic transfer information to a quality degradation detection and locating device 1401 (hereinafter, referred to as the QDDL server). The QDDL server 1401 executes the detection of the quality degradation occurrence and the locating of the quality degradation. The QDDL server 1401 detects an occurrence situation of the service quality degradation of the system according to this embodiment in a specific period of time, on the basis of various messages or statistical information received from the CP-DPI 110 and the UP-DPI 111. In addition, the QDDL server 1401 calculates the probability of the quality degradation of each device in an EPC 102, on the basis of procedure statistical information and message statistical information received from the CP-DPI 110, and locates a quality degradation location. When the quality degradation occurs, the QDDL server 1401 transfers the quality degradation and quality degradation information 1403 of one or more located devices to an operation support system 1402 (hereinafter, referred to as the OSS/BSS server). In addition, the QDDL server 1401 requests the OSS/BSS server 1402 to execute control such as a load distribution and a setting change to eliminate the quality degradation.

Figure 15:
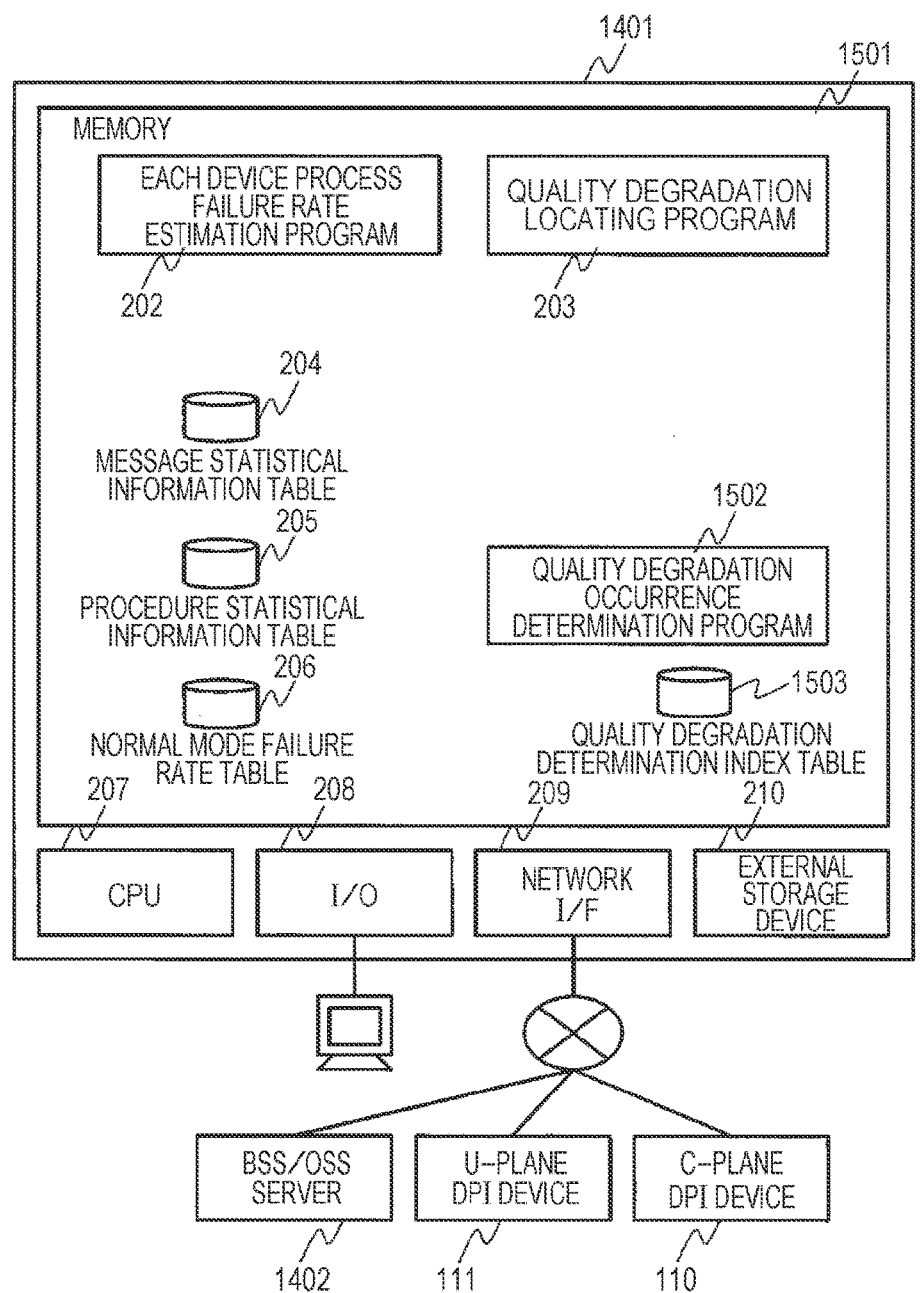
FIG. 15 illustrates a configuration example of a quality degradation locating device in the third embodiment.

FIG. 15 illustrates a configuration example of the QDDL server 1401 according to this embodiment. The QDDL server 1401 in this embodiment performs communication with the CP-DPI 110, the UP-DPI 111, and the OSS/BSS server 1402 via a network interface 209. A memory 1501 of the QDDL server 1401 stores a quality degradation occurrence determination program 1502, each device process failure rate estimation program 202, and a quality degradation locating program 203. In addition, the memory 1501 of the QDDL server 1401 stores a quality degradation determination index table 1503, a message statistical information table 204 to store a process trial number, a success number, and a failure number of a received message in the single device of the EPC 102, a procedure statistical information table 205 to store a trial number, a success number, and a failure number of the entire of a series of call flows extending to a plurality of devices of the EPC 102, and a normal mode failure rate table 206 to store a process failure rate calculation result of each device of the EPC 102 in a normal mode.

Figure 16:
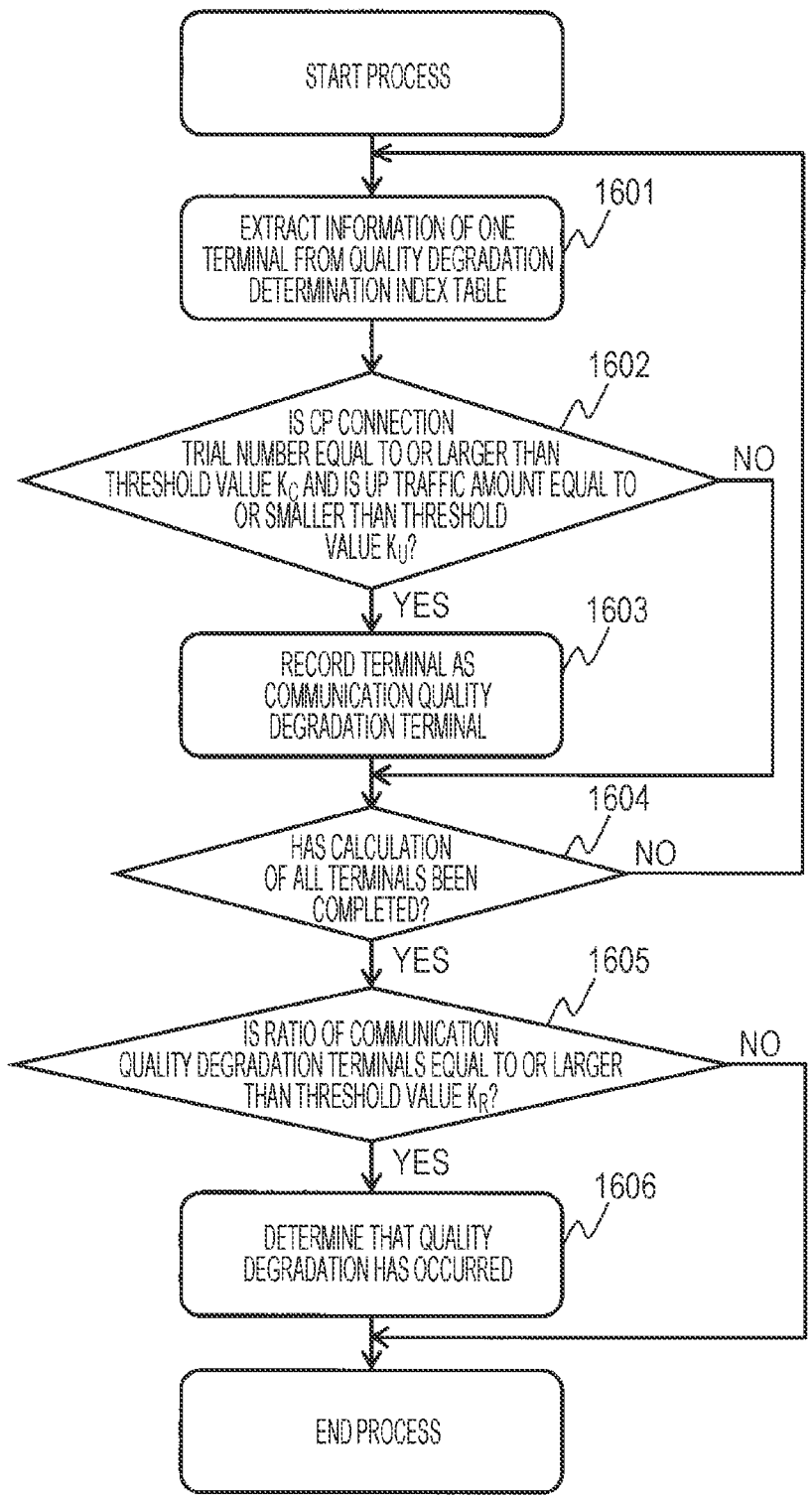
FIG. 16 illustrates an example of a process flow of a quality degradation occurrence determination program in the third embodiment.

An example of a process flow of the quality degradation occurrence determination program 1502 according to this embodiment will be described using FIG. 16. In step 1601, the QDDL server 1401 extracts information of one terminal from the quality degradation determination index table 1503. Next, in step 1602, the QDDL server 1401 determines whether a connection trial number in a C-Plane of the extracted terminal is equal to or larger than a predetermined threshold value $K_C$ and a traffic amount in a U-Plane thereof is equal to or smaller than a predetermined threshold value $K_U$. In this case, in step 1603, the terminal is recorded as a communication quality degradation terminal. In step 1604, the QDDL server 1401 determines whether calculation has been completed for all of terminals in the quality degradation determination index table 1503. When a non-calculation terminal exists, the QDDL server 1401 returns to step 1601 and selects a next terminal and executes the calculation. When the calculation has been completed for all of the terminals, the QDDL server 1401 proceeds to step 1605 and determines whether a ratio of the terminals recorded as the quality degradation terminals is equal to or larger than a predetermined threshold value $K_R$. When the ratio is equal to or larger than the threshold value $K_R$, the QDDL server 1401 determines that the quality degradation has occurred (step 1606). The threshold values $K_C$, $K_U$, and $K_R$ may be set arbitrarily by the operator in advance.

FIG. 17 illustrates an example of the quality degradation determination index table 1503 held by the QDDL server 1401. The quality degradation determination index includes a mobile subscriber identification number 1701 (hereinafter, referred to as the IMSI) and an IP address 1702 becoming an identifier of the terminal, a connection trial number 1703 in the C-Plane acquired from the CP-DPI 110, and a traffic amount 1704 in the U-Plane acquired from the UP-DPI 111.

In this embodiment, the method of determining the quality degradation occurrence using the connection trial number in the C-Plane and the traffic amount in the U-Plane as the quality degradation determination index has been described. However, the quality degradation occurrence can be determined by a different method using different information as the quality degradation determination index.

In addition, in the message communicated between the QDDI server 1401 and the OSS/BSS server 1402, three items (a device ID, a quality degradation index, and a process failure rate) are included for each of the devices in which the quality degradation index is more than a predetermined threshold value.

What is claimed is:

1. A communication method based on a quality degradation analysis method, the method comprising:
   acquiring a trial number and a number of failures of a procedure for each of a plurality of mobile devices, wherein the procedure includes a series of call flows extending to each of the plurality of devices from a mobile core network via a communication pathway;

acquiring a process trial number and a process number of failures for a message received as part of the procedure;

calculating a possibility of quality degradation for each particular device from the plurality of mobile devices based on the trial number, the number of failures of the procedure, the process trial number and the process failure number;

estimating a process failure rate of each particular device from the plurality of mobile devices based on the trial number, the number of failures of the procedure, the process trial number and the process failure number of failures of the process associated with the message received by the particular device;

calculating a cumulative distribution of the process failure rate of the plurality of mobile devices;

determining an index value for the possibility of the quality degradation based on the cumulative distribution; and modifying the communication pathway based on the index value, wherein the communication pathway includes one or more Evolved Node Bs (eNB) and one or more Mobility Management Entities (MME).

2. The method according to claim 1, further comprising:
detecting a degradation of a service quality of the mobile core network and
setting the service quality a specific period after the detecting the degradation of the service quality of the mobile core network.

3. The method according to claim 1, further comprising:
analyzing a data of interfaces of each particular device from the plurality of devices to acquire the trial number, the number of failures of the procedure, the process trial number and the number of failures of the process associated with the message received by the particular device.

4. The method according to claim 1, further comprising:
analyzing logs of each particular device from the plurality of devices to acquire the trial number, the number of failures of the procedure, the process trial number and the number of failures of the process associated with the message received by the particular device.

5. The method according to claim 1, further comprising:
displaying identifiers for each particular device from the plurality of devices and the possibility of the quality degradation associated with the particular device.

6. The quality analysis method according to claim 1, further comprising:
acquiring the trial number, the number of failures of the procedure, the process trial number and the number of failures of the process associated with the message received by the particular device, based on an equation that relates the failure rate of the procedure and a particular failure rate of each processing step of the procedure; and
calculating the process failure rate for the plurality of devices, by weighing the failure rate of each particular device with a number of executions of procedures of each particular device.

7. A quality degradation analysis device, the device comprising:
a memory;
an input/output interface;
a network interface, wherein the network interface is communicatively coupled to a mobile core network and a plurality of mobile devices; and
a processor communicatively coupled to the memory, the input/output interface and the network interface;

wherein the processor:
acquires a trial number and a failure number of a procedure for each of the plurality of mobile devices, wherein the procedure includes a series of call flows extending to each of the plurality of devices from the mobile core network via a communication pathway, acquires a process trial number and a process failure number of a message received as part of the procedure, calculates a possibility of quality degradation for each particular device from the plurality of devices based on the trial number, the failure number of the procedure, the process trial number and the process failure number, estimates a process failure rate of each particular device from the plurality of devices based on the trial number, the failure number of the procedure, the process trial number and the process failure number, calculates a cumulative distribution of the process failure rate of the plurality of devices, determines an index value for the possibility of the quality degradation based on the cumulative distribution, and modifies the communication pathway based on the index value, wherein the communication pathway includes one or more Evolved Node Bs (eNB) and one or more Mobility Management Entities (MME).

8. The quality degradation analysis device according to claim 7, wherein the processor further:
detects a degradation of a service quality of the mobile core network, and
sets the service quality a specific period after the process detects the degradation of the service quality of the mobile core network.

9. The quality degradation analysis device according to claim 7, wherein the processor further:
acquires the trial number, the failure number of the procedure, the process trial number and the process failure number by analyzing data interfaces of each particular device.

10. The quality degradation analysis device according to claim 7, wherein the processor further:
acquires the trial number, the failure number of the procedure, the process trial number and the process failure number by analyzing logs of the particular device.

11. The quality degradation analysis device according to claim 7, wherein the processor further:
acquires the trial number, the failure number of the procedure, the process trial number and the process failure number, based on an equation that relates the failure rate of the procedure and a particular failure rate of each processing step of the procedure; and
calculates the process failure rate for the plurality of devices, by weighing the failure rate of each particular device with a number of executions of procedures of each particular device.

12. The quality degradation analysis device according to claim 7, further comprising a display communicatively coupled to the input/output interface;
wherein the display displays identifiers for each particular device from the plurality of devices and the possibility of the quality degradation associated with the particular device.

13. A network system, comprising:
a plurality of mobile devices that communicate via a communication pathway with a mobile core network, wherein the communication pathway includes one or more Evolved Node Bs (eNB) and one or more Mobility Management Entities (MME);

a quality degradation device communicatively coupled to the plurality of devices, wherein the quality degradation locating device includes:

a memory, an input/output interface, a network interface, wherein the network interface is communicatively coupled to the mobile core network, and a processor communicatively coupled to the memory, the input/out interface and the network interface;

wherein the processor of the quality degradation device:

acquires a trial number and a failure number of a procedure for each of the plurality of devices, wherein the procedure includes a series of call flows extending to each of the plurality of devices from the mobile core network via the communication pathway acquires a process trial number and a process failure number a message received as part of the procedure calculates a possibility of quality degradation for each particular device from the plurality of devices based on the trial number, the failure number of the procedure, the process trial number and the process failure number, estimates a process failure rate of each particular device from the plurality of devices based on the trial number, the failure number of the procedure, the process trial number and the process failure number, calculates a cumulative distribution of the process failure rate of the plurality of devices, determines an index value for the possibility of the quality degradation based on the cumulative distribution, and modifies the communication pathway based on the index value.

14. The network system according to claim 13, wherein the processor of the quality degradation analysis device further:

detects degradation of a service quality of the core mobile network, and sets the service quality a specific period after detecting the degradation of the service quality of the core mobile network.

15. The network system according to claim 13, further comprising:

an operation support system which controls the plurality of devices, wherein the processor of quality degradation analysis device further:

requests the operation support system to execute control of a specific device based on the possibility of the quality degradation of the specific device.

16. The network system according to claim 13, wherein the processor of the quality degradation locating device further:

acquires the trial number, the failure number of the procedure, the process trial number and the process failure number, based on an equation that relates the failure rate of the procedure and a particular failure rate of each processing step of the procedure; and calculates the process failure rate for the plurality of devices, by weighing the failure rate of each particular device with a number of executions of procedures of each particular device.

17. The network system according to claim 13, wherein the quality degradation locating device further:

displays identifiers for each particular device from the plurality of devices and the possibility of the quality degradation associated with the particular device.

* * * * *